United States Patent
Croxford et al.

(10) Patent No.: US 11,874,469 B2
(45) Date of Patent: Jan. 16, 2024

(54) HOLOGRAPHIC IMAGING SYSTEM

(71) Applicant: Arm Limited, Cambridge (GB)

(72) Inventors: Daren Croxford, Cambridge (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/649,754

(22) Filed: Feb. 2, 2022

(65) Prior Publication Data
US 2022/0244543 A1 Aug. 4, 2022

(30) Foreign Application Priority Data
Feb. 3, 2021 (GB) ...................................... 2101513

(51) Int. Cl.
G02B 27/01 (2006.01)
G06F 3/01 (2006.01)

(52) U.S. Cl.
CPC ......... *G02B 27/0172* (2013.01); *G06F 3/013* (2013.01); *G02B 2027/014* (2013.01); *G02B 2027/0138* (2013.01); *G02B 2027/0174* (2013.01); *G02B 2027/0178* (2013.01)

(58) Field of Classification Search
CPC ........ G02B 27/0172; G02B 2027/0138; G02B 2027/014; G02B 2027/0174; G02B 2027/0178; G02B 2027/0109; G02B 2027/0118; G02B 27/0093; G02B 27/0103; G02B 27/017; G06F 3/013; G06F 3/011; G03H 1/2294; G03H 2001/226; G06T 19/006; G06T 2207/20221
See application file for complete search history.

(56) References Cited

U.S. PATENT DOCUMENTS

2016/0379408 A1* 12/2016 Wright ............... G02B 27/0172
345/633
2019/0064526 A1* 2/2019 Connor ................ G02B 6/0073
2020/0393690 A1* 12/2020 Lee ......................... H04N 23/56
2021/0003872 A1* 1/2021 Russell .............. G02B 27/0172

FOREIGN PATENT DOCUMENTS

WO 2016014876 A1 1/2016
WO 2016209608 A1 12/2016

OTHER PUBLICATIONS

United Kingdom Combined Search and Examination report dated Aug. 4, 2021 for GB Application No. GB2101513.6.
Zhang et al., "Fundamentals of phase-only liquid crystal on silicon (LCOS) devices", Oct. 24, 2014.
Wilson et al., "Design and prototype of an augmented reality display with per-pixel mutual occlusion capability", Nov. 21, 2017, vol. 25, No. 24.

* cited by examiner

*Primary Examiner* — Amit Chatly
(74) *Attorney, Agent, or Firm* — EIP US LLP (57) ABSTRACT

A method of controlling an imaging system for a Head Mounted Display (HMD) device. The method comprises capturing an external scene, for example using a camera, determining an attenuation pattern, for rendering a filter area. The method also comprises determining, based on the captured external scene, a compensation pattern to for compensating at least part of the filter area, attenuating the external scene using the attenuation pattern and generating a holographic image of a virtual object, the holographic image including the compensation pattern.

20 Claims, 6 Drawing Sheets

502 Determining, based on a virtual object, an attenuation pattern for rendering a filter area on a display for showing an external scene

504 Capturing an external scene

506 Determining, based on the captured external scene, a compensation pattern for compensating at least part of the filter area

508 Attenuating the external scene using the attenuation pattern

510 Generating a holographic image of the virtual object

512 Displaying the generated holographic image such that the virtual object and the compensation pattern are shown in the filter area

*FIG. 5*

HOLOGRAPHIC IMAGING SYSTEM

CROSS-REFERENCE TO RELATED APPLICATIONS

This application claims priority pursuant to 35 U.S.C. 119(a) to United Kingdom Patent Application No. 2101513.6, filed Feb. 3, 2021, which application is incorporated herein by reference in its entirety.

TECHNICAL FIELD

The present invention relates to an imaging system for a head-mounted display (HMD) device, and a method of controlling such.

BACKGROUND

Many electronic devices can display visual content to a user, such as image, text, or video content. Such display devices range from the relatively large, such as televisions, to the relatively small and portable, such as smartphones and smart watches. Known devices for displaying visual content to a user include head-mounted displays (HMDs). HMDs may be used for various purposes, including augmented reality (AR), mixed reality (MR) and virtual reality (VR), which collectively fall within the umbrella term "extended reality" (XR) used to describe immersive technologies that can merge the physical and virtual world in a manner that extends the reality that humans can experience.

SUMMARY

According to a first aspect, there is provided an imaging system for a head-mounted display, HMD, device, the imaging system comprising: a holographic image generator for generating a holographic image including a virtual object to be displayed in an external scene; a light attenuator; a camera to capture the external scene; and at least one controller configured to: determine, based on the virtual object, an attenuation pattern, for rendering a filter area at the light attenuator; and determine, based on the captured external scene, a compensation pattern for compensating at least part of the filter area.

According to a second aspect, there is provided a method of controlling an imaging system for a head-mounted display, HMD, device, the method comprising: determining, based on a virtual object, an attenuation pattern, for rendering a filter area on a display for showing an external scene; capturing an external scene; determining, based on the captured external scene, a compensation pattern for compensating at least part of the filter area; attenuating the external scene using the attenuation pattern; generating a holographic image of the virtual object; and displaying the generated holographic image such that the virtual object and the compensation pattern are shown in the filter area.

According to a third aspect of the invention there is provided a non-transitory computer readable medium having a set of instructions stored therein, when executed by a processor, causing the processor to perform a plurality of functions, including: determining, based on a virtual object, an attenuation pattern for rendering a filter area on a display for showing an external scene; receiving a captured external scene; determining, based on the captured external scene, a compensation pattern for compensating at least part of the filter area; determining a holographic image including the virtual object; and outputting image data for showing the virtual object and the compensation pattern in the filter area.

According to a fourth aspect of the invention, there is provided an imaging system for a head-mounted display, HMD, device, the imaging system comprising: a holographic image generator for generating a holographic image of a virtual object; a display for showing the holographic image in an external scene, the display including a light attenuator; a camera to capture the external scene; and a controller configured to determine an amount of attenuation to be applied by the light attenuator, such that the amount of attenuation varies in accordance with difference between a luminance of the captured external scene and a luminance of the holographic image.

According to a fifth aspect of the invention, there is provided an HMD device comprising the imaging system according to the first aspect.

Further features, and advantages of, the invention will become apparent from the following description of examples of the invention, which is made with reference to the accompanying drawings.

DETAILED DESCRIPTION

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
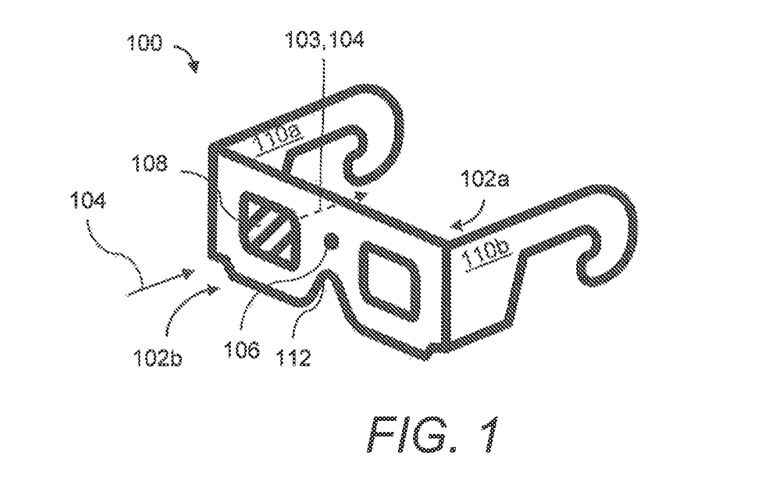
FIG. 1 shows a schematic diagram of an HMD device according to examples.

FIG. 1 is a schematic diagram of an imaging system 100 comprising a head-mounted display (HMD) device according to examples herein. An HMD device is for example a device that is wearable on a user's head for displaying an image to the user, such as an augmented reality (AR) image, a mixed reality (MR) image or a virtual reality (VR) image. A first side 102a of the imaging system 100 is for facing a user of the imaging system 100. The imaging system 100 has a second side 102b opposite to the first side 102a. The first side 102a of the imaging system 100 is therefore closer to the user than the second side 102b when the HMD device is mounted on the user's head.

The imaging system 100 includes a holographic image generator such as a red-green-blue (RGB) laser combined with a reflective spatial light modulator (RSLM) or other type of holographic image generator, e.g. an RGB laser combined with a micromirror array or a scanning mirror. In examples where the holographic image generator is an RSLM, the RSLM is configured to modulate a phase and/or intensity of an incident light beam generated by the laser. The RSLM may comprise a Liquid Crystal on Silicon (LCoS) panel.

The holographic image generator can generate a holographic image of a virtual object, based on holographic image data obtained and processed for generation of the holographic image using a graphics processing subsystem. The holographic image data may be computer-generated using known techniques, such as for example described in Zhao, Yu & Alam, Shahinur & Jeon, Seok-Hee & Kim, Nam. "Fast calculation method for full-color computer-generated holographic image with real objects captured by a depth camera", Electronic Imaging, 2018, 2501-2506, the contents of which are incorporated by reference.

The holographic image generator is configured to generate, during rendering of a holographic image, projected light 103 which is directed towards an eye of a user of the HMD. In this way, the user can view the holographic image.

The example imaging system 100 of FIG. 1 includes a display portion 108 for displaying the holographic image to the user. The display portion 108 in this case corresponds to the section of the imaging system 100 that is used to project light towards the user during the display of the holographic image, so that the user can view the holographic image. The display portion 108 in the example of FIG. 1 is partially transparent so that at least a portion of external light 104 incident on the display portion 108 is transmitted through the display portion 108. In this way, the user can view an external scene through the display portion 108. The display portion 108 is thus a combiner display, e.g. a see-through electronic display, that allows the user to see what is shown on the display screen while still being able to see an external scene through it. A holographic image displayed by the imaging system 100 may appear as if it is superimposed on the external scene in this case. In other cases, though, the luminance of the holographic image may be sufficient that the user is unable to perceive the external scene behind the holographic image, e.g. if the holographic image is displayed using all of the display portion 108 or a region of the display portion 108 corresponding to a field of view of the user. A boundary of the display portion 108, for example, corresponds to a boundary of a frame or other mounting apparatus for mounting the display portion 108. In these cases, the display portion 108 may be taken to correspond to a partially transparent screen region of the imaging system 100, which is bounded by a frame (which may be opaque or at least partially opaque to incident light, although need not be).

It is to be appreciated that transmission or reflection of a portion of light as described herein for example may refer to transmission or reflection of a subset of wavelengths of a range of wavelengths or to transmission or reflection of light (e.g. across the spectrum of wavelengths of visible light) but with a coefficient of transmission or reflection that is less than 1. In examples herein, light is considered to encompass visible light (e.g. with a wavelength from around 400 nm to around 700 nm), but may also include light outside the visible spectrum, such as infrared and/or ultraviolet light.

In FIG. 1, the display portion 108 is disposed between a first side portion 110a and a second side portion 110b of the imaging system 100. The HMD device will have head fixing parts. In this example, the imaging system 100 is in the form of glasses, and the head fixing parts are first and second side portions 110a, 110b corresponding to arms of the glasses (sometimes referred to as temples), which are stems that extend from each side of the display portion 108. When the imaging system 100 is mounted on the user's face, e.g. with a bridge portion 112 of the display portion 108 resting on the user's nose, the first and second side portions 110a, 110b extend along opposite sides of the user's face, and hook or otherwise rest over the user's ears to secure the imaging system 100 in place on the user's head. At least one of the first or second side portions 110a, 110b may incorporate a pod for housing a holographic image generator.

Figure 2:
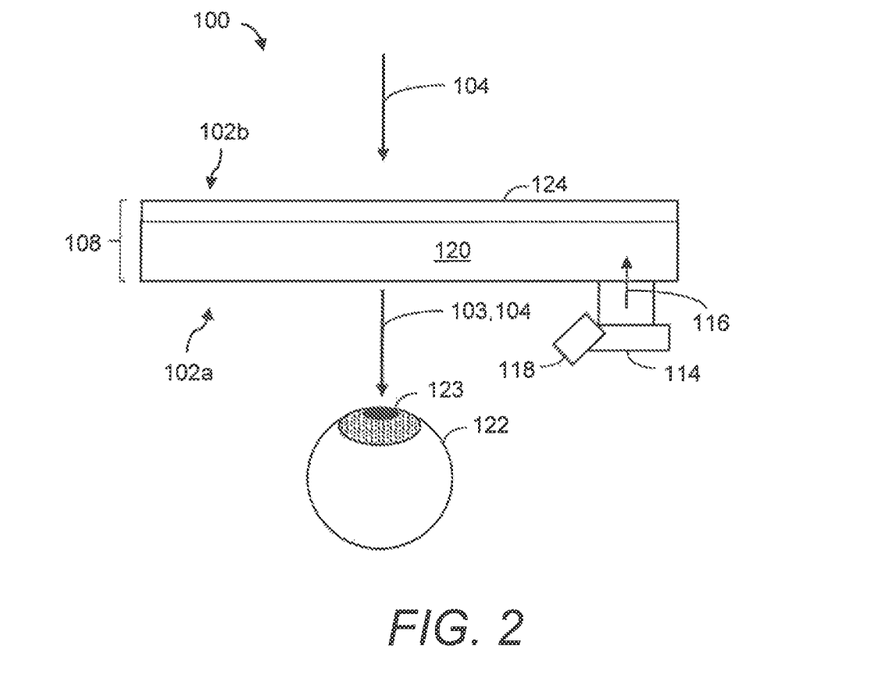
FIG. 2 shows a schematic diagram showing features of the HMD device of FIG. 1 in more detail.

FIG. 2 is a schematic diagram showing features of the imaging system 100 of FIG. 1 in more detail. It is to be appreciated that FIG. 2 is not to scale: the size of certain elements has been exaggerated for ease of illustration. As explained with reference to FIG. 1, the imaging system 100 includes a holographic image generator 114 for displaying a holographic image. Light 116 emanating from the holographic image generator 114 during the display of the image is directed into a waveguide 120. The waveguide 120 emits projected light 103 into an eye 122 of a user so that the user can view the holographic image generated by the holographic image generator 114, along with the external light 104 which is transmitted through the display portion 108. Although not shown in FIG. 2 (which illustrates part of the imaging system 100 of FIG. 1), it is to be appreciated that another holographic image generator and waveguide in this case also projects a corresponding holographic image towards the other eye of the user. In other cases, the waveguide 120 guides the light towards only one eye of the user, e.g. when implemented in a monocular HMD device.

The functional components of the waveguide 120 include input and output couplers. These can be either simple prisms, microprism arrays, embedded mirror arrays, surface relief gratings (SRGs), thin or thick analogue holographic gratings, metasurfaces, or resonant waveguide gratings (RWGs). In examples, the waveguide 120 of FIG. 2 is a holographic waveguide, e.g. which includes one or more (reflective) holographic optical elements, HOEs, for example of the type by Digilens Inc. For example, a first set of HOEs reflects incident light and guides the light along the waveguide until the light is incident on a second set of HOEs, which reflect the projected light 103 out of the waveguide 120. Other suitable types of waveguides are provided by Lumus, Ltd of Israel.

As shown in FIG. 1, the imaging system 100 includes at least one camera 106 to capture an external scene. For example, the camera 106 faces forward away from the user to capture images of the user's real-world environment from the user's point-of-view. The camera 106 may be used to obtain observation data representative of an observation of the external scene being viewed by the user through the imaging system 100. The observation data can be processed by the at least one processor of the imaging system 100 to obtain luminance data and, optionally, chrominance data. The imaging system 100 may consider chrominance information and modify the holographic image (on a region by region basis) in dependence upon the chrominance of the holographic image and the external scene that the holographic image is in front of. For example, to display a virtual white ball in front of a red wall, a cyan holographic image of the ball can be is mixed with light from the external scene to generate a white ball.

In one example, the observation data includes pixel intensity values indicative of a luminance of respective portions of the external scene. Luminance is a photometric measure of the luminous intensity of light traversing a unit area, and is related to the brightness of the external scene. The pixel intensity values can be processed to obtain the luminance data. For example, the luminance data may represent an average of the pixel values, calculated on a spatially variant basis across the display portion 108, or an average of those pixel values over time for a period of observation. Luminance Y can be calculated in a number of ways, for example:

$$Y=(R+G+B)/3$$

Or, since the eye is more sensitive to green, the green component may be weighted in the summation more highly than the red or blue components:

$$Y=0.299R+0.587G+0.114B$$

Or $$Y=0.2126R+0.7152G+0.0722B$$

In addition to the forward-facing camera 106 to capture scenes of the external scene, the imaging system 100 also includes an eye-sensing subsystem 118, which may also be referred to as an "eye-tracker". The eye-sensing subsystem 118, e.g. including an eye-tracking sensor, may be configured to track a gaze of the user to determine where the user is looking at a given time. For example, the eye-tracking subsystem 118 determines a gaze direction of the user at a given time, a gaze angular area covered by the user during a given time period, and/or a fixation characteristic of the user. Such gaze characteristics may also be used to provide other functionality to the HMD device, e.g. as part of an AR or VR system, such as foveation.

In some examples, the eye-sensing subsystem 118 is configured to capture eye characteristic data, representative of one or more characteristics of an eye 122, or both eyes, of a wearer of the HMD device 100. For example, whilst the eye-sensing subsystem 118 may detect the gaze direction of a pupil 123, or otherwise detect the location of an eye relative to the HMD device 100, the eye-sensing subsystem 118 may additionally or alternatively detect a size characteristic of a pupil 123 of the eye 122 of the user.

In examples, an eye-tracking sensor of the eye-sensing subsystem 118 comprises an optical sensor which can track the motion of one or both eyes 122 of the user by detecting light reflected from the eye 122 of the user with a video camera or other optical sensor. The eye tracking sub system may illuminate the user's eye with infrared (IR) light, and the optical sensor may be visible light, and/or infrared sensitive. Eye sensors may indicate current eye positional characteristics, provide accurate eye location information, and/or information as to whether the user is aware of the external scene at a given time, for example sensing whether the user has their eyes closed, e.g. while blinking, and where their eye is focused. The data output by the eye-sensing subsystem 118 may be used to identify or recognize a visual object that the user is focusing on in their external scene. Alternatively, or additionally, the eye-sensing subsystem 118 comprises an electrical potential eye sensor which utilizes electrical potentials measured within one or more electrodes placed around an eye 122 of the user. For example, the eye-sensing subsystem 118 may utilize electroencephalography (EEG), electromyography (EMG), or electrooculography (EOG) signal detection to track motion of the eye 122 of the user. Electrical potential eye-tracking sensors may provide an indication of movement before movement actually begins, and hence can provide low latency. The one or more electrodes may be positioned on the imaging system 100 such that when the imaging system 100 is worn by the user, the one or more electrodes are placed around an eye 122 of the user.

The imaging system 100 also includes an external scene light attenuator 124, for example a transmissive spatial light modulator (TSLM) which may include a liquid crystal polarizer layer. The light attenuator 124 may comprise an attenuation light field display, having multiple layers in the form of alternating liquid crystal (LC) layers followed by polarising layers. Alternatively, the light attenuator 124 may comprise a polarization light field display, having a polariser followed by more than one LC layers followed by a polariser layer. The light attenuator 124 provides light attenuation in selected regions of the external scene. The light attenuator 124 is preferably positioned on the second side 102b of the imaging system 100 relative to the waveguide 120 so that the light 104 emitted from the waveguide 120 towards the eye 122 is not attenuated by the light attenuator 124. The modulation of the light attenuator 124 is spatially selective and may be controlled on a per-pixel basis, for example the light attenuator is pixelated as an array of pixels such that one pixel in the array can have a given transmissivity while another pixel in the array can have another, different, transmissivity.

In examples, light incident on the imaging system 100 is attenuated where it is desired to project a holographic image to the user of the imaging system 100. By controlling the light attenuator 124 to selectively filter light to reduce the amount of light transferred through the imaging system 100, a selected part of the external scene, referred to herein as an attenuation pattern, appears darker to the user, so that detail in the holographic image is more clearly visible to the user and so that the holographic image is effectively occluding the parts of the external scene over which the holographic object is intended to sit.

The attenuation pattern may be based at least in part on the external scene. The amount of attenuation may be controlled on a pixel-by-pixel basis in the attenuation pattern so that the transmissivity in certain areas of the light attenuator 124, corresponding to parts of the external scene which are relatively bright, is less than the transmissivity in other areas of the light attenuator 124, corresponding to parts of the external scene which are relatively dark. For example, if the external scene includes a bright-and-dark checkerboard pattern immediately behind the holographic image, the attenuation pattern may have a corresponding checkerboard effect, to reduce the visibility of the checkerboard pattern immediately behind the holographic image. This is particularly useful when displaying a virtual object with at least some dark regions that is coincident in space with a bright region of the environment.

The attenuation pattern may also, or alternatively, be based at least in part on the holographic image. The amount of attenuation may be controlled on a pixel-by-pixel basis in the attenuation pattern so that the transmissivity in certain areas of the light attenuator 124, corresponding to parts of the holographic image which are relatively dark, is less than the transmissivity in other areas of the light attenuator 124, corresponding to parts of the holographic image which are relatively bright. For example, if the holographic image includes a bright-and-dark checkerboard pattern against a relatively homogeneous external scene, such as a blank wall, the attenuation pattern may have a corresponding checkerboard effect, to reduce the visibility of the relatively homogeneous external scene immediately behind the holographic image. This is again useful when displaying a virtual object with at least some dark regions that is coincident in space with a bright region of the environment.

To account for spatial variations in luminance of both the external scene and the holographic image, the attenuation pattern may be based at least in part on the external scene and at least in part on the holographic image. For example, the amount of attenuation may be controlled based on a luminance of the external scene, less the luminance of the holographic image plus a constant. Thus, if the external scene is relatively dark and the holographic image is relatively bright, the amount of attenuation may be relatively low or a minimum. On the other hand, if the external scene is relatively bright and the holographic image is relatively dark, the amount of attenuation may be relatively high or a maximum. Meanwhile, if the external scene is of approximately the same luminance as the holographic image, the amount of attenuation may be set at a medium level. This difference in luminance may be calculated to set the amount of attenuation, based on an average luminance across the entire area occupied by the holographic image of the external scene and an average luminance of the holographic image itself, or may be controlled on luminance difference on a pixel-by-pixel basis.

To allow control of a visibility of a holographic image projected onto the display portion 108 of the imaging system 100, the imaging system 100 includes at least one controller. The at least one controller is configured to obtain the eye characteristic data captured by the eye-sensing subsystem 118 and determine, based thereon, a pixelated attenuation pattern for rendering a filter area at the light attenuator. For example, the pixelated attenuation pattern is rendered by the light attenuator 124 to control the attenuation of individual pixels and reduce the amount of light transferred across the imaging system 100 in an area of the external scene, e.g. corresponding to a location in the external scene in which the holographic image is to be rendered, so that area appears darker in the external scene. When the holographic image is then combined with the filtered external scene light, the holographic image is more clearly visible to the user, and/or the virtual holographic object is viewed by the user with the intended visual characteristics. A relatively dark holographic image in front of a relatively bright region of the environment, can now have the intended luminance.

The pixelated attenuation pattern, for rendering the filter region, is in this example based on eye characteristic data. A pupil is not a single-point receptor but rather a multi-point receptor, e.g. more like an aperture than a pinhole. Therefore, to dim an area of the observed scene corresponding to a given object—in this case a holographic object to be inserted into the scene—and to prevent a C around the object, an area larger than that occupied by the given object is dimmed in this example. Note that the filter area may only cover a selected region of the external scene, and different levels of dimming may be applied in different parts of the filter area, for example on a pixel-by-pixel basis.

Figure 3A:
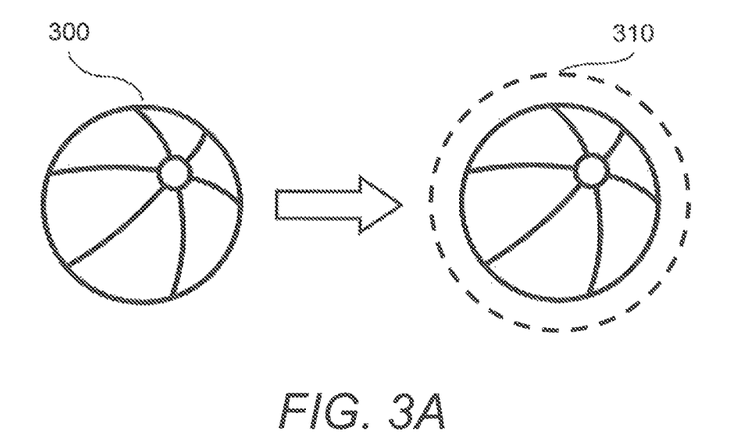
FIGS. 3A to 3D show a scene viewable with the HMD device at different stages of rendering and compensating a filter pattern applied at a light attenuator of the imaging system.

FIG. 3A shows a virtual object 300 and the filter area 310 determined by the at least one controller to be rendered at the light attenuator, for overlaying the virtual object 300 to be displayed as a holographic image in the scene, based on the eye characteristic data. In general, the at least one controller is configured to obtain virtual object data for inserting a virtual object into the external scene as the computer-generated holographic image, the filter area being based on an area occupied by the virtual object data in the external scene. As shown in FIG. 3A, a size and a shape of the filter area 310 is determined based on an area to be occupied by the virtual object 300 when inserted into the scene.

Figure 3B:
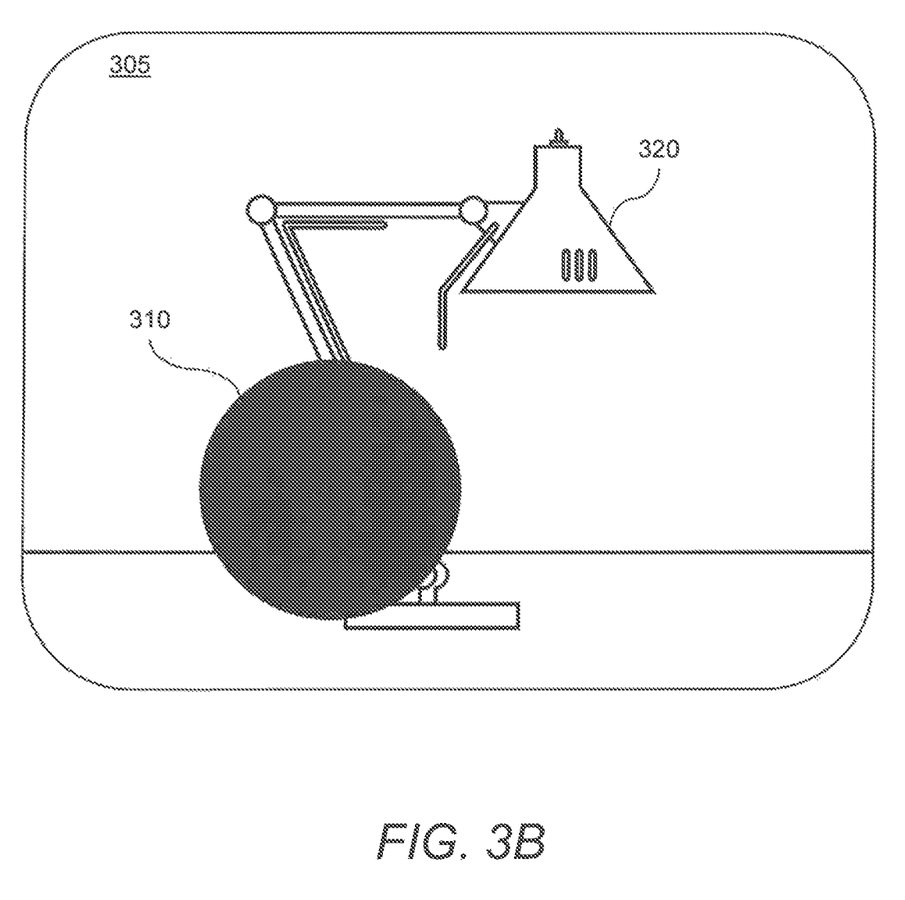

As illustrated in FIG. 3B, the filter area 310 may be an enlarged silhouette of the virtual object 300 to be displayed. The silhouette may be enlarged by scaling the area, with the scaling amount determined based on the eye characteristic data, e.g. pupil dilation. Instead of scaling, an edge may be added to the base pattern shape, the base pattern shape being that of the virtual object. The width of the edge width may be varied based on the eye characteristic data, e.g. pupil dilation. Whilst shown as a silhouette with a hard boundary, there is no need for a hard boundary between the attenuated and non-attenuated areas; there may be some smoothing at the transition between them; the attenuation pattern may include areas with relatively low attenuation near the boundary compared to areas further from the boundary to enable such smoothing.

As described above, the eye characteristic data additionally or alternatively includes a gaze direction of a pupil. For example, where the user is not looking in the direction of a holographic image to be displayed in the scene, the filter area may not dim at least part of a region corresponding to the location of the holographic image in the scene.

In addition to determining the pixelated attenuation pattern, for rendering the filter area at the light attenuator 124, the at least one controller is configured to determine a spatially-variant compensation pattern for compensating at least part of the filter area, based on the captured scene. Since the light attenuator is controlled to dim, in the filter area 310, a larger region than the virtual object 300 in the scene 305, at least part of the filter area is to be compensated so as to reduce unwanted dimming of subregions of the image. For example, a boundary of the filter area 310 has a larger area than the virtual object, as shown in FIG. 3A, the larger area being based on the eye characteristic data. An edge region 315 between a first edge of the virtual object 300 and a second edge of the filter area 310 is therefore compensated, in the example shown in FIG. 3C, to reduce dimming of the region in the scene 305 observed by the user. The compensation pattern may have intensity and colour values which are varied from pixel to pixel based on the captured scene. The compensation pattern may be holographic, or non-holographic. When holographic, the compensation pattern is a calculated holographic image part. A single holographic image including the virtual object may include the compensation pattern.

Given that calculation of a the compensation pattern in addition to the holographic image may be resource-intensive, the addition of the compensation pattern to a holographic image may be selectively activated depending on visibility of the holographic image to a user—for example the compensation pattern may be omitted if the holographic image is detected to be outside a current region of focus of the user's eye, and/or if the holographic image is in the far distance as viewed by the user. Conversely, the compensation pattern may be activated if the holographic image is detected to be inside a current region of focus of the user's eye, and/or if the holographic image is in the far distance as viewed by the user.

The compensation pattern is applied at the holographic image generator to compensate at least part of the filter area 310. For example, the at least one controller is configured to modulate intensity and/or colour values in an edge region 315 corresponding to at least part of the filter area 310 to compensate the patterning of the edge region 315 in the scene 305 viewed by the user through the display portion 108. The pixelated compensation pattern may comprise compensation values to add to respective pixel values at the holographic image generator. For example, a microdisplay illuminated by an RGB laser modulates RGB intensity values at selected pixels in the array. Pixel-by-pixel compensation value values can be added to pixels in which the holographic image is being generated with low intensity, such that the compensation values are added to the RGB intensity values representative of the holographic image data. Pixel-by-pixel compensation values can be alternatively, or in addition, added for pixels in the patterning region, in which no holographic image is being generated.

For example, the intensity values of each pixel of the virtual image (also referred to herein as luminance values), are stored with a greyscale or brightness level of, e.g. from 0 to 255 per colour band for 8-bit data. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. For a colour image, a pixel value of an intensity or brightness for each pixel may be stored separately for each colour channel. If a pixel is represented by three values, for example, in the RGB (red, green, blue) or YUV colour spaces (where Y represents the luma of the colour, U represents the difference between the blue component of the colour and the luma and V represents the difference between the red component of the colour and the luma), the visual appearance of each pixel may be represented by three intensity values, one for each primary colour, for example with a bit precision of 8 bits per colour channel. In examples in which image data is processed to adjust the luminance values associated with respective pixels of the image, the luminance values of the pixels may be scaled up or down, e.g. so that each of the pixels corresponds to a brightness level which differs by n brightness levels from an original brightness level (within an available range of brightness levels). Separately to adjusting specific luminance values in a spatially-variant manner to compensate at least part of the filter area, as discussed, such an approach may also be used to apply a global adjustment to the luminance values of the pixels, and may be combined with other adjustments (e.g. tone patterning) to maintain the image quality.

Figure 3C:
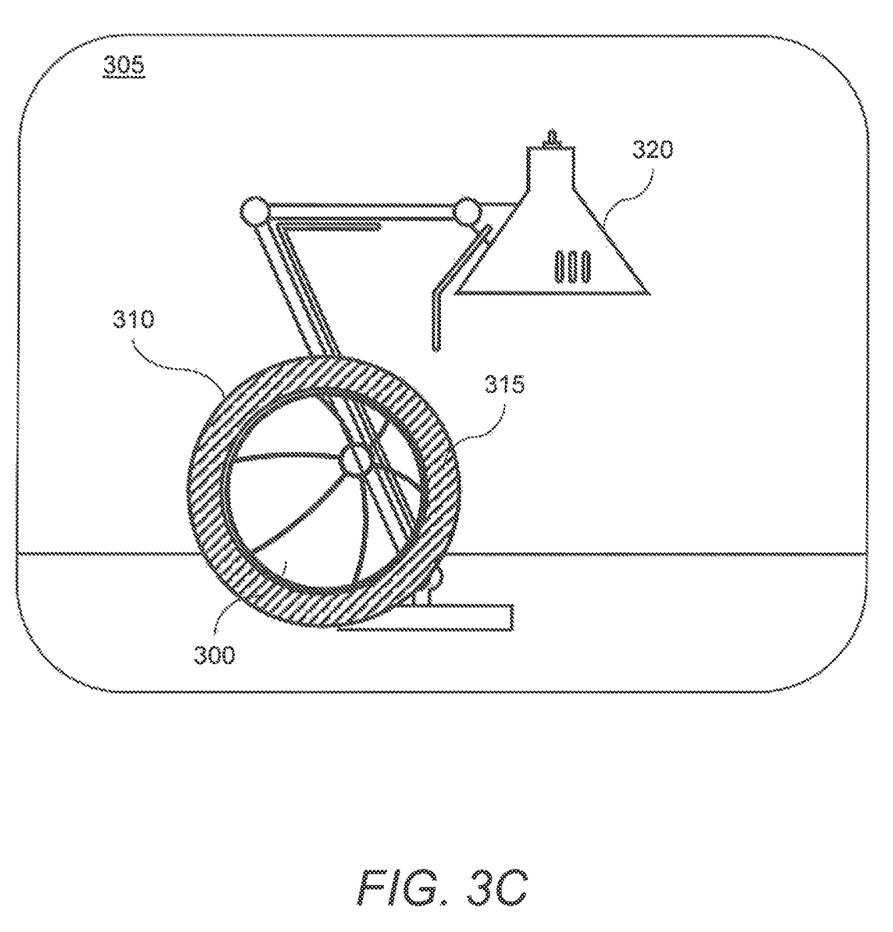

In the example shown in FIG. 3C, the edge region 315 of the filter area 310 is an annular region based on the circular shape of the filter area 310, which is in turn based on the circular shape of the ball object 300 to be inserted into the scene 305.

In some examples, the at least one controller is configured to smooth the pixel values of the compensation pattern corresponding to the edge region 315 of the filter area 310 between the first edge and the second edge. For example, the luminance across the edge region 315 is smoothed to generate a smoothed transition of luminance between the brighter region outside the filter area 310 and the darker region of the holographic image object 300. Such smoothing may reduce the presence of sharp edges at the boundary of the filter area 310 in the observable scene 305.

In examples, the at least one controller is configured to determine a spatially-variant compensation pattern based on target pixel values for the holographic image. For example, the target pixel values may correspond to an intended luminance of the virtual object when displayed in the scene as a holographic image. The filter area 310 at the light attenuator works to reduce the luminance of the external scene in the region where the virtual object is to be displayed as a holographic image, so that the virtual object can be seen against a bright external scene or object, while the compensation at the holographic image generator works to increase the luminance to the intended luminance for the virtual object by the at least one controller adding to the pixel values. For example, the at least one controller is configured to modulate pixel values at the microdisplay, based on the pixelated compensation pattern, to compensate the at least part of the filter area.

Figure 3D:
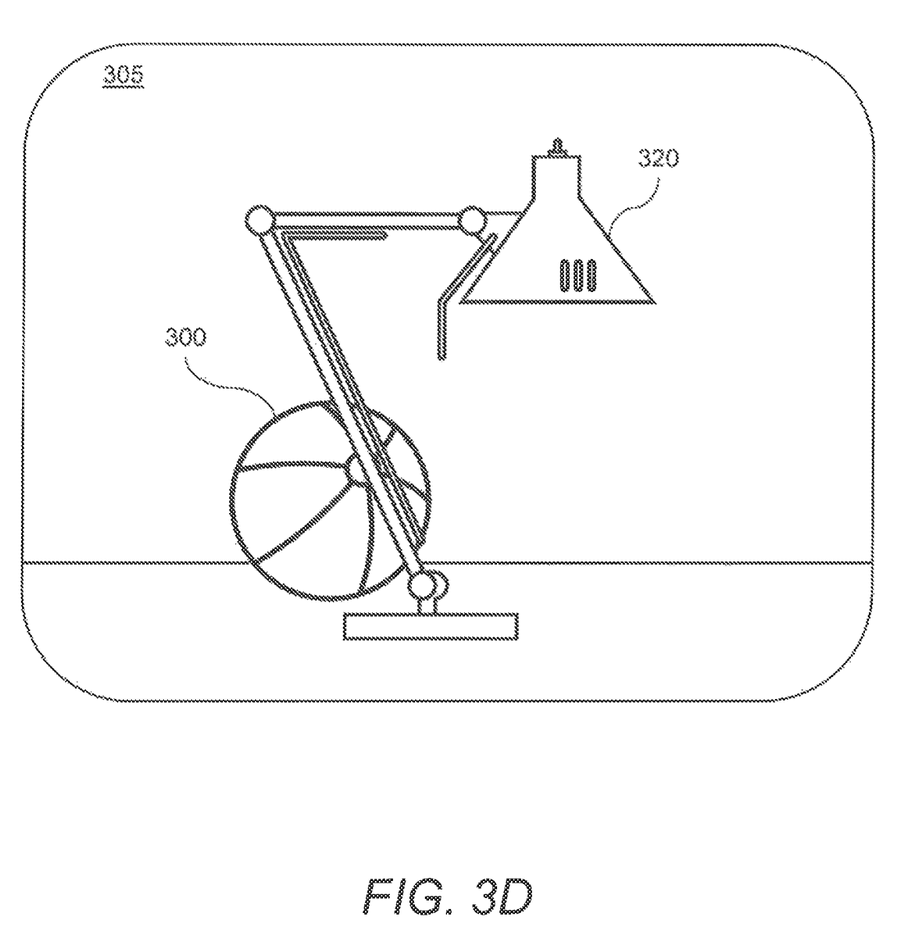

FIG. 3D shows the result of patterning and compensation on a scene as viewed by the user through the HMD. Depth data, e.g. obtained from a depth sensor on the HMD (discussed further below with reference to FIG. 4) or by processing captured images of the scene, is applied to provide mutual occlusion between objects at different depths in the scene. For example, the ball 300 is inserted behind the lamp 320 in the scene, such that the lamp 320 is closer to the user than the inserted ball 300. Based on the obtained depth data and knowing the relative location of the lamp 320 in the scene, pixels in one or more portions of the ball 300 occluded by the lamp 320 are removed from the holographic image rendering and added to the compensation pattern. In this way, the holographic image shows the remaining portions of the ball 300 which are viewable to the user from behind the lamp 320.

Figure 4:
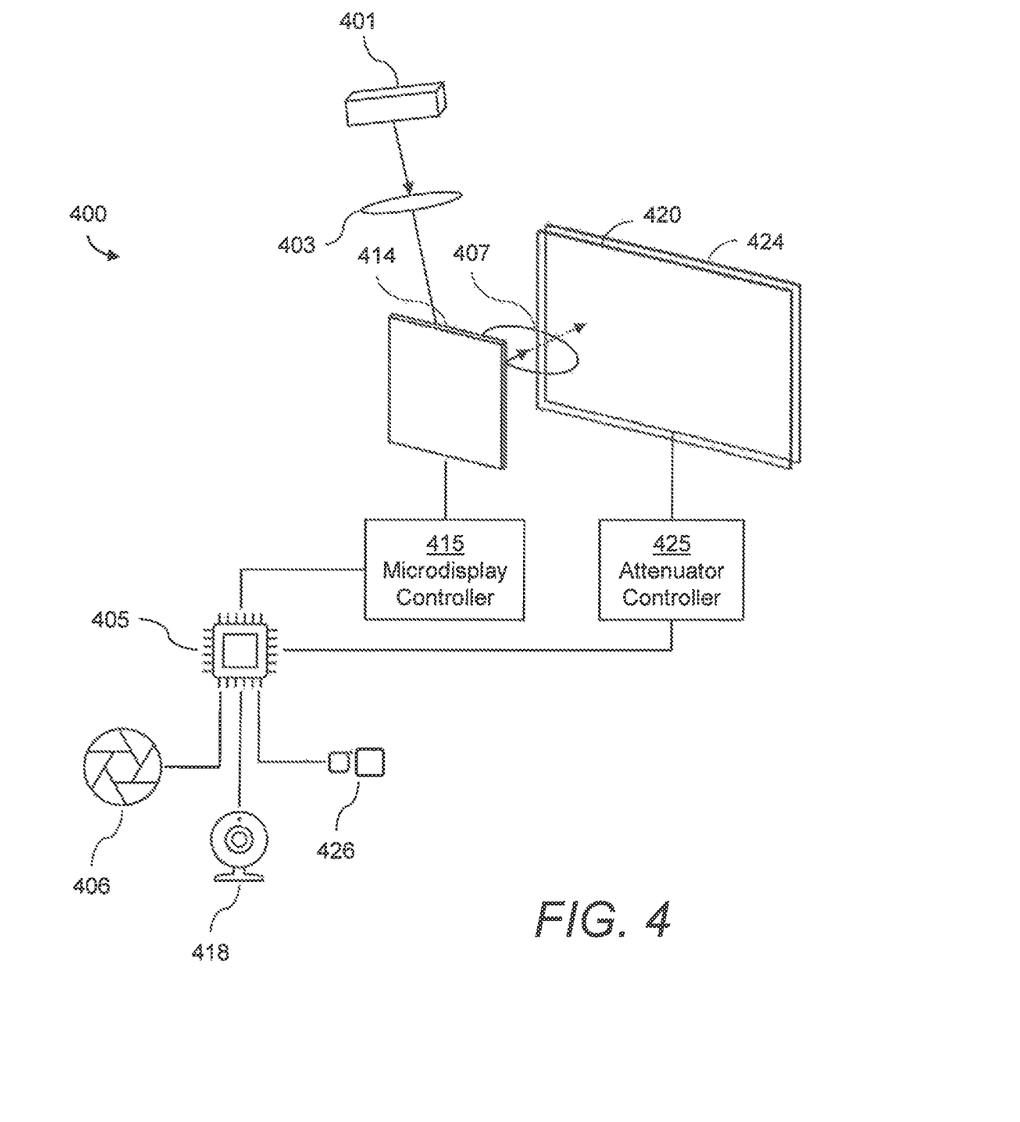
FIG. 4 shows an imaging system for a HMD device according to examples.

FIG. 4 is a schematic diagram illustrating components of an imaging system 400 for an HMD according to examples herein. Features of the imaging system 400 of FIG. 4 that are the same as corresponding features of the imaging system 100 of FIGS. 1 and 2 are labelled with the same reference numeral but incremented by 300; corresponding descriptions should be understood to apply to corresponding features.

The imaging system 400 includes a microdisplay 414 in the form of a reflective spatial light modulator (RSLM), e.g. a Liquid Crystal on Silicon (LCoS) panel. The microdisplay 414 is illuminated by a beam of light from an RGB laser 401 as the light source, via a beam expander 403 configured to expand the light beam. A microdisplay controller 415 is configured to control the microdisplay 414, on a pixel-by-pixel basis.

The imaging system 400 also includes a light attenuator 424 connected to a light attenuator controller 425, which is configured to modulate transmissivities of individual sub-regions, also referred to as pixels, for incoming light coming from the external scene. Note that the number, and equivalent size, of the pixels of the light attenuator 424 may not correspond to the number, and equivalent size of the pixels of the microdisplay 414. The light attenuator 424 may have less pixels than the microdisplay 414, and may therefore attenuate light at different granularity than the light being generated for the holographic display. The light attenuator controller 425 is connected to a camera 406 and an eye-sensing subsystem 418 for the HMD device.

The microdisplay 414 is configured to generate a holographic image based on holographic data obtained by the microdisplay controller 415. In the example of FIG. 4, the microdisplay controller 415 is connected to a system on a chip (SoC) processor 405 which generates the computer-generated holographic image (CGH), e.g. of a virtual object, and transfers the holographic data to the microdisplay controller 415. During reproduction of the holographic image by the microdisplay 414, light is reflected by the microdisplay 414 and directed to the waveguide (not shown) which projects light selectively in an area of the light attenuator 424, via lens 407. This holographic image generator therefore projects the holographic image of the virtual object onto the real-world external scene viewed by a user of the HMD device. The light attenuator 424 is configured to attenuate the luminance of the light coming from the external scene on a pixelated basis. The attenuation is based on an attenuation pattern from the light attenuator controller 425, for example, which can pattern a filter area in the observed scene based on an area in which the virtual object is to be displayed as the holographic image. This allows virtual holographic objects to be displayed, and more clearly viewable, on relatively light physical backgrounds.

The attenuation pattern may be determined by the light attenuator controller 425 based on eye characteristic data captured by the eye-sensing subsystem 418. For example, a size of the filter area represented in the attenuation pattern may be dependent on a dilation amount of a pupil in the eye of the HMD wearer, since a more dilated pupil presents a wider aperture for receiving light rays from the external scene.

Eye characteristic data may in the alternative, or in addition, be based on a configuration setting for a specific user. For example, the configuration setting may be an average pupil size of the user. A configuration setting for a user may be based on user's specific optical prescription or eye characteristics. The device may determine the user (for example using biometrics or login) and then the appropriate eye characteristic data is configured. This may be augmented with eye characteristic data captured by the eye-sensing subsystem 418 as the user begins to use the device.

At least one of the microdisplay controller 415 and the light attenuator controller 425, or another controller, determines a compensation pattern to apply at the microdisplay based on the scene captured at the camera 406. For example, a larger filter area than the virtual object is patterned in the scene by the light attenuator, and at least part of the filter area is to be compensated at the microdisplay so as to reduce unwanted dimming in the filter area in a region surrounding the virtual object. The luminance values in the compensated subregions are modulated at the microdisplay controller 415, for example. The eye-sensing subsystem 418 may be used to determine where the user's eye(s) is/are focused (eye tracking) and its/their pupil size, etc. This information may be used as input into the attenuation controller.

The microdisplay controller 415 and the light attenuator controller 425, along with any other controller, of the imaging system 400 correspond to the at least one controller described in examples of the imaging system 100 with reference to FIGS. 1-2. Each controller may additionally be configured to perform other processing and/or controlling functions. Components of the imaging system 400 may be communicatively coupled via at least one bus, which may have a limited bandwidth. Operations performed by the controller components may be carried out by hardware and/or software. Each of the controller components may be implemented using machine readable instructions and suitably programmed or configured hardware, such as circuitry. Each of the controller components can include a processor, microprocessor, microcontroller, processor module or subsystem, programmable integrated circuit, programmable gate array or other computing device. The controller components may comprise multiple co-located processors or multiple disparately located processors. The processor may all be located in the HMD device, or some processing resources may be located in wirelessly and/or wired coupled processing units. For example, some processing may be performed in the HMD device, whilst other processing may be performed in a smartphone, a local general-purpose computer (such as a PC) or in the cloud. In some examples, the at least one controller comprises computer-useable volatile and/or non-volatile memory configured to store information and/or instructions for the controller components, which may be considered to correspond to local storage of the at least one controller. Computer-useable volatile and/or non-volatile memory may be coupled with the bus. The computer-useable memory may comprise random access memory (RAM) and/or read-only memory (ROM).

The imaging system 400 also includes storage, for storing various data, in examples. In examples, the storage is configured to store holographic data representing virtual object to be displayed by the microdisplay 414. In examples, the storage is also configured to store luminance data indicative of a luminance of incident light incident on the external scene side of the HMD device, e.g. as described with reference to FIGS. 1 and 2. The storage may be a RAM such as DDR-SDRAM (double data rate synchronous dynamic random access memory). In other examples, the storage may be or include a non-volatile memory such as a ROM, non-volatile memory (NVRAM) or a solid state drive (SSD) such as Flash memory. The storage in examples includes further storage devices. The storage may be removable or non-removable from the imaging system 400 or HMD device. Access to the storage may be controlled by a dynamic memory controller (DMC), not shown in FIG. 4.

The camera 406, which may incorporate multiple cameras, may be referred to as an image capture subsystem. The camera 406 is operable to obtain still images or moving images (i.e. video) of the external scene and is therefore operable to capture an observation of the external scene. The at least one controller, e.g. the light attenuator controller 425, may be configured to obtain the luminance data indicative of the luminance of the incident light based on observation data obtained by the camera 406, representing at least one observation of the external scene. The at least one controller may be configured to implement computer vision (CV) functionality based on processing of the observation data obtained by the camera 406, e.g. to perform object detection and/or recognition. As explained with reference to FIG. 1 and FIG. 2, the luminance data can be obtained efficiently from the observation data, using existing components of the HMD device.

A depth sensor 426 may be incorporated for creating a depth map for spatial mapping of the external scene. The compensation pattern may be determined at least in part on the basis of the output of the depth sensor. The generated spatial map may be used, as described above, for the purpose of occlusion processing and for the purpose of adding a compensation pattern, corresponding to a part of a real-world object, in areas in which such a part of a real world object should appear to occlude a holographic image but are filtered out by the attenuation pattern.

The components of the imaging system 400 in the example of FIG. 4 may be interconnected using a systems bus. This allows data to be transferred between the various components. The bus may be or include any suitable interface or bus. For example, an ARM® Advanced Microcontroller Bus Architecture (AMBA®) interface, such as the Advanced eXtensible Interface (AXI), may be used.

Figure 5:
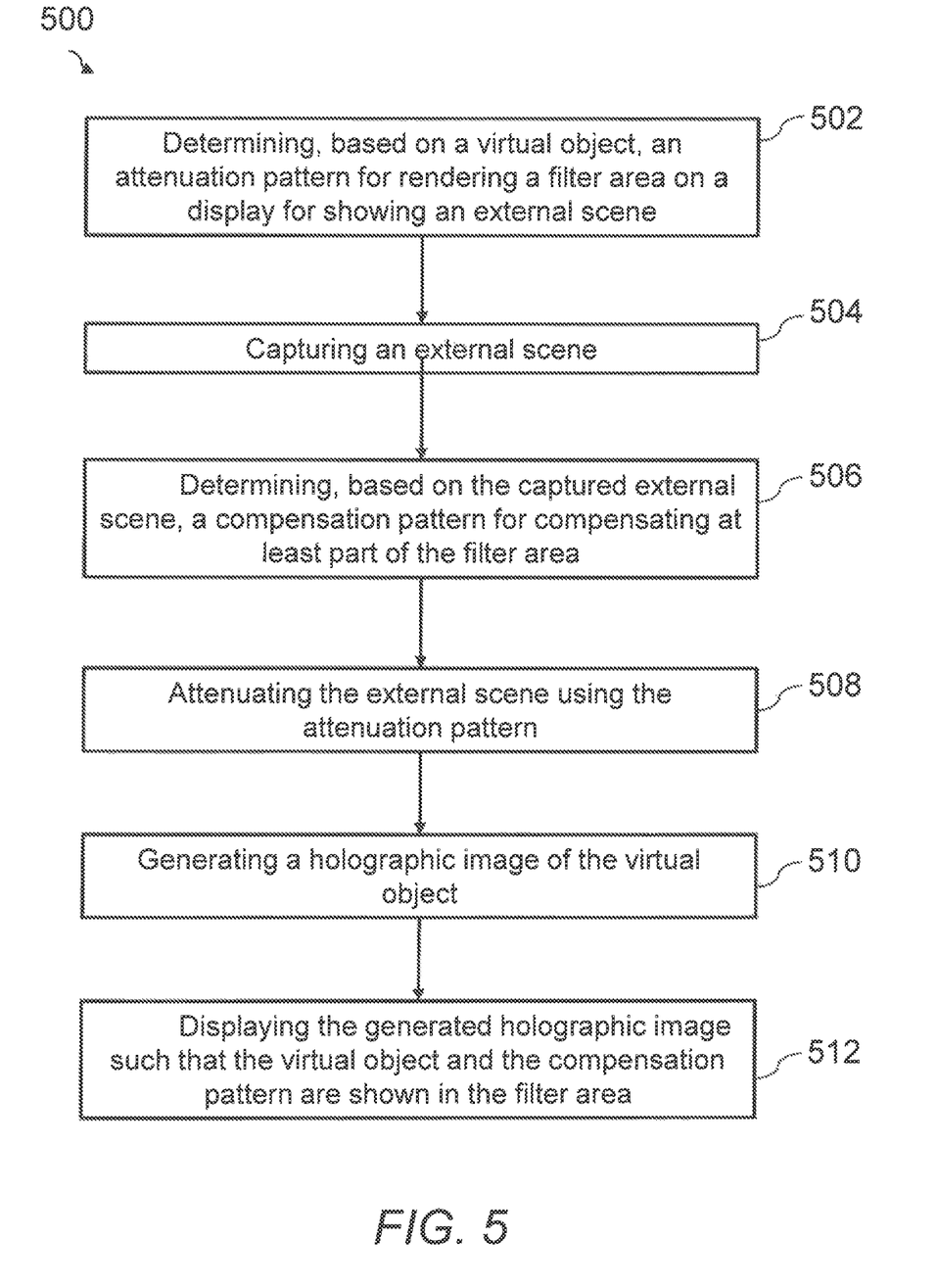
FIG. 5 illustrates an exemplary method of controlling an imaging system for an HMD device.

FIG. 5 illustrates an exemplary method 500 of controlling an imaging system for a HMD device as described in any of the examples above. In step 502, the method comprises determining, based on a virtual object, an attenuation pattern for rendering a filter area on a display for showing an external scene. In step 504, the method comprises capturing an external scene, for example using a camera. In step 506, the method comprises determining, based on the captured external scene, a compensation pattern for compensating at least part of the filter area. In step 508, the method comprises attenuating the external scene using the attenuation pattern. In step 510, the method comprises generating a holographic image of a virtual object, and in step 512, the generated holographic image is displayed such that the virtual object and the compensation pattern are shown in the filter area. Note that the order of steps in FIG. 5 may be altered, for example steps 508 and 510 may be reversed in order.

The above embodiments are to be understood as illustrative examples of the invention. Further embodiments are envisaged. For example, the imaging system 100 of FIG. 1 is in the form of glasses. However, in other cases, an HMD with features otherwise similar to or the same as the HMD of examples herein may have a different structure. For example, the HMD may be in the form of a headset, which may include suitable mounting apparatus, such as a frame and/or strap, for mounting or otherwise coupling the HMD to the user's head. An HMD in accordance with examples herein may be monocular, with a display device arranged to project an image into one eye of a user. In other cases, the HMD may be binocular and arranged to project an image into both eyes of a user.

In the above embodiments, the light attenuator is a transmissive spatial light modulator which is able to control levels of attenuation on a pixel-by-pixel basis. In an alternative, the light attenuator may be a spatially uniform attenuator, with a single attenuation level across its width which can be controlled at least in part on the external scene and at least in part on the holographic image. For example, the amount of attenuation may be controlled based on a luminance of the external scene, less the luminance of the holographic image plus a constant. Thus, if the external scene is relatively dark and the holographic image is relatively bright, the amount of attenuation may be relatively low or a minimum. On the other hand, if the external scene is relatively bright and the holographic image is relatively dark, the amount of attenuation may be relatively high or a maximum. Meanwhile, if the external scene is of approximately the same luminance as the holographic image, the amount of attenuation may be set at a medium level. This difference in luminance may be calculated to set the amount of attenuation, based on an average luminance across the entire area occupied by the holographic image of the external scene and an average luminance of the holographic image itself.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An imaging system for a head-mounted display, HMD, device, the imaging system comprising:
    a holographic image generator for generating a holographic image including a virtual object to be displayed in an external scene;
    a light attenuator for forming part of a display to display the external scene;
    a camera to capture the external scene; and
    at least one controller configured to:
        determine, based on the virtual object, an attenuation pattern, for rendering a filter area at the light attenuator; and
        determine, based on the captured external scene, a compensation pattern for compensating at least part of the filter area,
    wherein the holographic image generator projects the generated holographic image onto the light attenuator such that the virtual object and the compensation pattern are shown in the filter area.

2. An imaging system according to claim 1, wherein the attenuation pattern is determined based on an area to be occupied by the virtual object when displayed in the external scene.

3. An imaging system according to claim 1, wherein the at least one controller is configured to obtain eye characteristic data, representative of at least one characteristic of the eye of a wearer of the HMD device, and wherein the attenuation pattern is determined based on the eye characteristic data.

4. An imaging system according to claim 3, wherein the eye characteristic comprises at least one of a user-specific configuration setting, a dilation size of a pupil, and a gaze direction of a pupil.

5. An imaging system according to claim 3, wherein a boundary of the filter area has a larger area than the virtual object when displayed in the external scene, the larger area being based on the eye characteristic data.

6. An imaging system according to claim 1, wherein the at least one controller is configured to determine the compensation pattern at least in part on the basis of the virtual object.

7. An imaging system according to claim 6, wherein the at least one controller is configured to determine the compensation pattern at least in part on the basis of target pixel values for the virtual object.

8. An imaging system according to claim 7, wherein the at least one controller is configured to smooth pixel values of the compensation pattern based on the external scene.

9. An imaging system according to claim 1, further comprising a depth sensor, and wherein the at least one controller is configured to determine the compensation pattern at least in part on the basis of a spatial map of the external scene created from the output of the depth sensor.

10. An imaging system according to claim 1, wherein the at least one controller is configured to determine the compensation pattern as part of the holographic image.

11. An imaging system according to claim 1, wherein the holographic image generator comprises a liquid crystal on silicon, LCoS, panel.

12. A method of controlling an imaging system for a head-mounted display, HMD, device, the method comprising:
    determining, based on a virtual object, an attenuation pattern, for rendering a filter area on a light attenuator for forming part of a display for showing an external scene;
    capturing an external scene;
    determining, based on the captured external scene, a compensation pattern for compensating at least part of the filter area;
    attenuating the external scene using the attenuation pattern;
    generating a holographic image of the virtual object; and
    projecting the generated holographic image onto the light attenuator such that the virtual object and the compensation pattern are shown in the filter area.

13. A method according to claim 12, wherein the attenuation pattern is determined based on an area to be occupied by the virtual object when displayed in the external scene.

14. A method according to claim 12, comprising obtaining eye characteristic data, representative of at least one characteristic of the eye of a wearer of the HMD device, and determining the attenuation pattern based on the eye characteristic data, wherein the eye characteristic comprises at least one of a user-specific configuration setting, a dilation size of a pupil, and/or a gaze direction of a pupil, and wherein a boundary of the filter area has a larger area than the virtual object, the larger area being based on the eye characteristic data.

15. A method according to claim 12, wherein the compensation pattern is based at least in part on the virtual object, and wherein determining the compensation pattern is based at least in part on target pixel values for the virtual object.

16. A method according to claim 15, comprising smoothing pixel values of the compensation pattern based on the captured external scene.

17. A method according to claim 12, comprising determining the compensation pattern based at least in part on a spatial map of the external scene created from the output of a depth sensor.

18. A method according to claim 17, comprising generating a holographic image including the virtual object, the holographic image including the compensation pattern.

19. A non-transitory computer readable medium having a set of instructions stored therein, when executed by a processor, causing the processor to perform a plurality of functions, including:

determining, based on a virtual object, an attenuation pattern for rendering a filter area on a light attenuator for forming part of a display for showing an external scene;

receiving a captured external scene;

determining, based on the captured external scene, a compensation pattern for compensating at least part of the filter area;

determining a holographic image including the virtual object; and outputting image data for showing the virtual object and the compensation pattern in the filter area of the light attenuator.

20. An imaging system for a head-mounted display, HMD, device, the imaging system comprising:

a holographic image generator for generating a holographic image of a virtual object;

a display for showing the holographic image in an external scene, the display including a light attenuator;

a camera to capture the external scene; and a controller configured to determine an amount of attenuation to be applied by the light attenuator, such that the amount of attenuation varies in accordance with difference between a luminance of the captured external scene and a luminance of the holographic image, wherein the holographic image generator projects the generated holographic image onto the light attenuator such that the virtual object is shown in an attenuated area of the light attenuator.

* * * * *